United States Patent [19]

Scully

[11] 4,244,143
[45] Jan. 13, 1981

[54] HIGHWAY GAME

[76] Inventor: Terrence A. Scully, 65 E. 39th Ave., Vancouver, British Columbia, Canada, V5W 1J6

[21] Appl. No.: 949,628

[22] Filed: Oct. 10, 1978

[51] Int. Cl.³ .................. A63H 17/00; A63B 67/00; G09B 9/02; G09F 19/00
[52] U.S. Cl. .................................. 46/202; 273/1 E; 272/17; 46/248; 40/438; 434/63
[58] Field of Search ............... 46/202, 248; 273/86 F, 273/86 G, 1 G, 1 H, 1 I, 1 T, 1 E; 272/16, 17; 40/421, 423, 426, 436, 438; 104/83, 84, 85; 35/11 R

[56]  References Cited
U.S. PATENT DOCUMENTS

| 766,614 | 8/1904 | Haberstick | 272/17 |
|---|---|---|---|
| 1,600,039 | 9/1926 | Cunningham | 272/16 |
| 2,413,633 | 12/1946 | Jones | 272/16 |
| 3,119,190 | 1/1964 | Cafulli et al. | 35/11 R |
| 3,159,400 | 12/1964 | Brass et al. | 273/1 E |
| 3,171,215 | 3/1965 | Glass et al. | 273/1 E |
| 3,707,781 | 1/1973 | Brown | 273/1 E |
| 3,819,178 | 6/1974 | Ochi | 273/1 E |

Primary Examiner—F. Barry Shay
Assistant Examiner—Michael J. Foycik, Jr.
Attorney, Agent, or Firm—Christie, Parker & Hale

[57] ABSTRACT

A highway game has a base supporting a conveyor-like roadway belt on which a toy vehicle is mounted. The vehicle has a control mechanism mounted at one end of the base and this mechanism includes a winding device wound with a tether secured to the vehicle. The roadway belt is driven in one direction by a motor to turn the wheels of the tethered vehicle and simulate movement of the vehicle in the opposite direction. The winding device of a simplified form of the game is mounted on a transverse shaft which can be rotated manually to shift the vehicle longitudinally on the rotating roadway belt. In a preferred embodiment of the game, the control mechanism is driven by a power take-off from the motor and the winding device is slidably mounted on a control shaft which is movable to engage and disengage the device from the drive so as to achieve a similar longitudinal movement of the vehicle. A slide on the base enables the winding device of each embodiment to be positioned so as to place the vehicle in a selected lane on the roadway belt.

7 Claims, 7 Drawing Figures

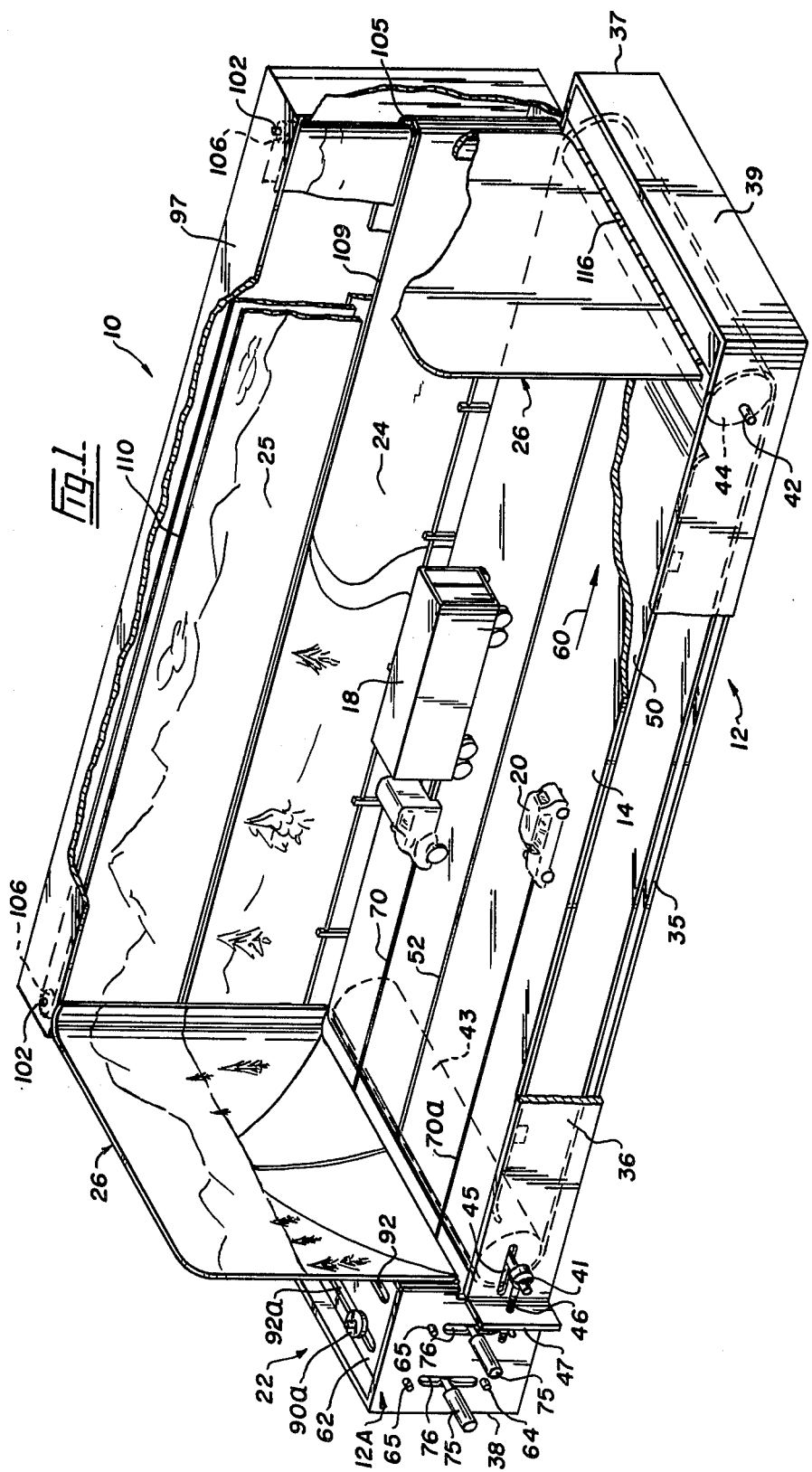

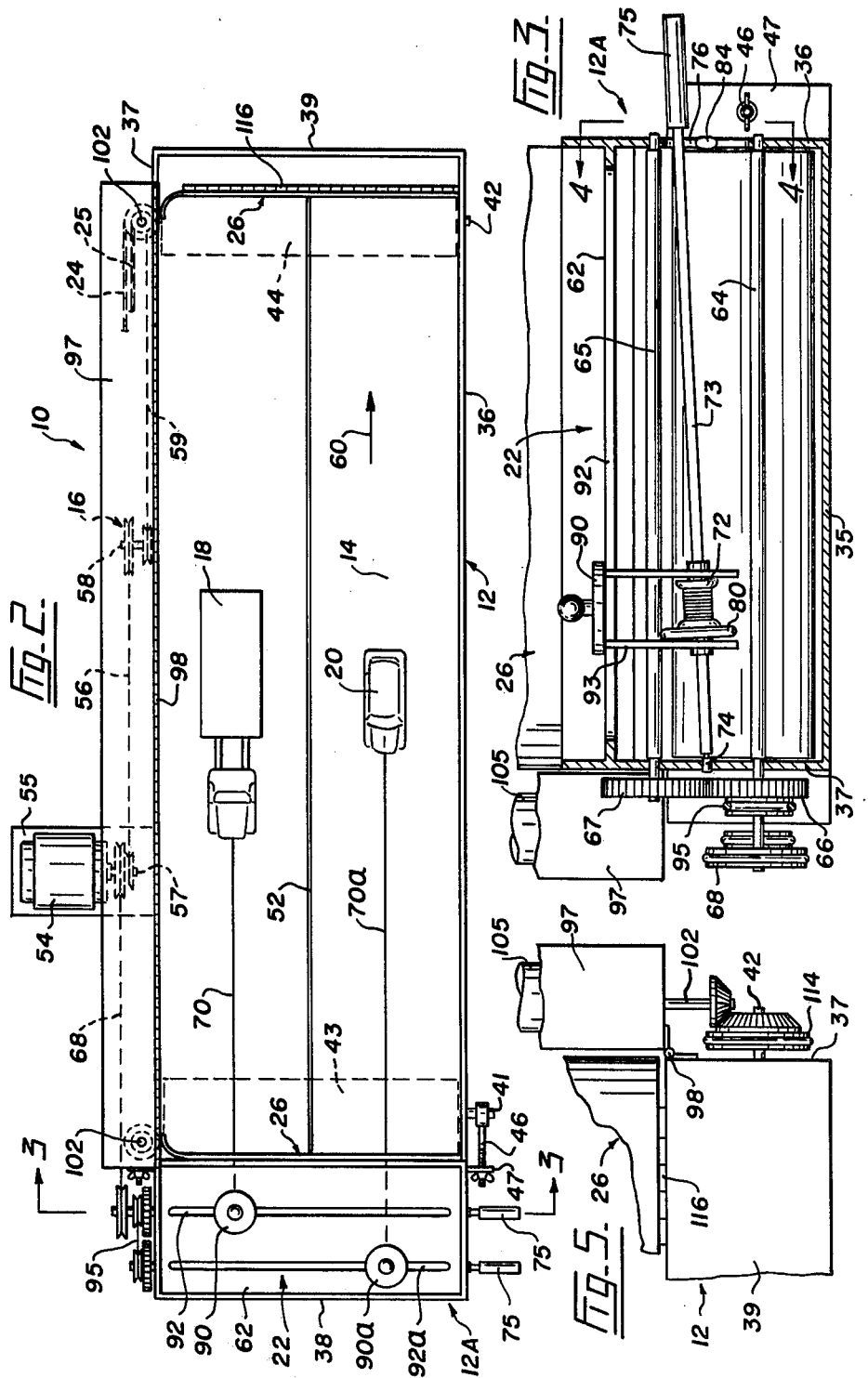

HIGHWAY GAME

BACKGROUND OF THE INVENTION

This invention relates to a game having a toy vehicle which can be maneuvered as though travelling on a highway.

It is known to construct display devices and the like so that viewers gain the impression they are seeing an automobile travelling along a highway, or a train rolling down a track. Very often the impression or illusion of vehicle movement is such that the attention of the viewers is held for only a short period of time.

SUMMARY OF THE INVENTION

The above as well as other disadvantages of display and advertising devices generally are overcome by the present invention which is a game capable of entertaining children and adults alike. The players need little imagination to visualize vehicles travelling at highway speeds and the game allows each player to have control over his own vehicle so that he can attempt to overtake and pass another vehicle and also to change lanes and to cut in ahead of the other vehicle if he wishes to do so.

Therefore, according to the present invention, there is provided a highway game which comprises a base, a roadway belt rotatably mounted on the base, a toy vehicle having wheels engaging the roadway belt, a control mechanism for the toy vehicle mounted at one end of the base, said control mechanism including a winding device wound with a tether secured to the vehicle, drive means for rotating the roadway belt in one direction to turn the wheels of the toy vehicle and simulate movement of said vehicle in the opposite direction, and turning means for rotating the winding device whereby to shift the toy vehicle longitudinally on the rotating roadway belt.

BRIEF DESCRIPTION OF THE DRAWINGS

FIG. 1 is a perspective view of a highway game constructed in accordance with a preferred embodiment of the invention, FIG. 2 is a plan of the highway game, FIG. 3 is an enlarged transverse section taken on the line 3—3 of FIG. 2 and showing a control mechanism for the game, FIG. 5 is a fragmentary elevation of the right, rear corner (FIGS. 1 and 2) of the game.

DESCRIPTION OF THE PREFERRED EMBODIMENTS

Figure 7:
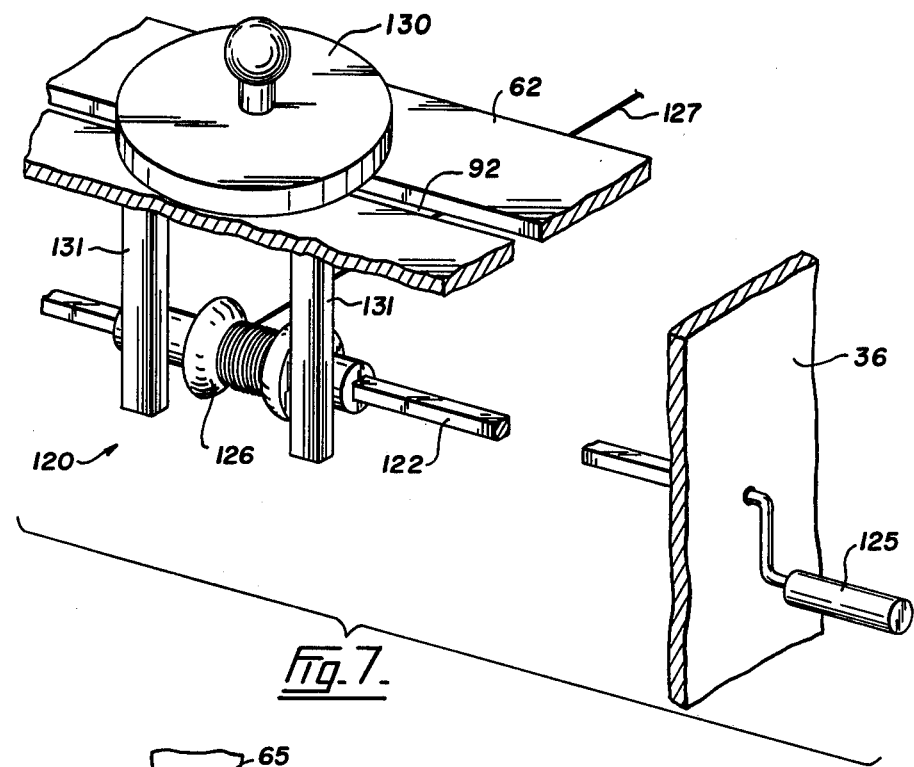
FIG. 7 is a perspective view, part broken away with some parts shown in section, of a hand-operated control mechanism for the simplified embodiment of the game.

The numeral 10 indicates generally a game constructed in accordance with a preferred embodiment of the present invention. The game has a base 12 on which a conveyor-like belt 14 is mounted. Drive means 16 of the game rotates the belt to provide a moving roadway for toy vehicles such as those designated by the numerals 18 and 20. Each vehicle is adapted to be maneuvered about on the simulated highway by a player operating a control mechanism 22 located at one end of the base. In order to increase the illusion of movement on a highway, the game is provided with moving background panels 24 and 25 on which scenes appear. Also, the game is provided with panels 26 which extend across opposite ends of the roadway belt 14 and these two end panels are painted with appropriate highway scenes as well.

The base generally indicated at 12 is a box-like structure having a bottom wall 35, front and rear walls 36 and 37, and opposite end walls 38 and 39. Shafts 41 and 42 are journalled in the front and rear walls of the base and these shafts are fitted with rollers 43 and 44 around which the belt 14 is trained. The rotatably mounted shaft 41 extends through slots 45 (one only shown in FIG. 1) formed in the front and rear walls of the base. A suitable belt tightener 46 secures each opposite end of the shaft 41 to a lug 47 on the base walls 36 and 37 whereby the tension of the belt 14 can be adjusted. A support plate 50 is carried by the walls 36 and 37 between the two rollers in a position to slidably engage the underside of the upper run of the belt 14 so as to keep that run from sagging. The belt is painted or otherwise marked with a center line 52 as well as any other road markings likely to appeal to the imagination of the persons playing the present game.

The drive means generally indicated at 16 is shown in FIGS. 2 and 3 to comprise a variable speed electric motor 54 which is shown mounted on a bracket 55 carried by ther rear wall 37 of the base. A suitable belt and pulley drive 56 connects drive shaft 57 of the motor to a shaft 58 journalled on the rear wall 37. Another belt and pulley drive 59 connects shaft 58 to the shaft 42 (see FIG. 1) of the roadway belt. Thus, the upper run of the belt 14 is caused to move in a direction indicated by arrow 60 appearing in FIGS. 1 and 2.

The vehicles 18 and 20 may be of any suitable design but must have wheels which will rotate freely when in contact with the moving belt at a time when the vehicles are controlled with regard to their movement with the belt. Both vehicles are controlled by the mechanisms each generally indicated at 22. FIGS. 1, 2 and 3 show the control mechanisms as having parts enclosed within an enlarged extension 12A of the base 12. This extension 12A is located at the left (i.e. FIG. 2) or forward end of the base and has a top wall 62. For example, the mechanism for operating the truck 18 can be seen in FIG. 3 to comprise shafts 64 and 65 which are journalled in the front and rear walls 36 and 37 of the base extension. A gear 66 is mounted on the rearmost end of the shaft 64 and this gear meshes with a similar gear 67 secured to the end of the shaft 65. These two parallel shafts are adapted to be driven at the same speed but in opposite directions. For that purpose, a belt and pulley drive connection 68 (FIG. 3) of the drive means connects the shaft 64 to the output shaft 57 of the electric motor.

Attached to the truck 18 running on the roadway belt is a tether 70 desirably formed of a fine yarn having the same color as the belt 14. The tether 70 runs along the top surface of the belt to a spool 72, see FIG. 3, slidably and non-rotatably mounted on a control arm 73 which is square in cross section. One end of the control arm 73 is pivotally secured as at 74 to the rear wall 37 of the base while the opposite end of the shaft, which is fitted with a handle 75, projects through a vertical slot 76 formed in the front wall 36 of the base. A friction wheel 80 is provided on the spool 72 and, by lowering and raising the arm 73, this friction wheel can be moved into and out of driving contact with one or the other of the horizontally disposed shafts 64 and 65. Thus, the arm 73 has inclined lower and upper operating positions and a neutral or horizontal position in which the friction wheel 80 is supported clear of the two counter-rotating shafts 64 and 65. The spool 72, of course, is rotated in one direction or the other when the friction wheel 80 is in contact with one or the other of the driven shafts and this results in the tether 70 being wound in or allowed to run out. Truck 18 is pulled towards its control mechanism when the spool winds in the tether and the truck is allowed to move rearwardly on the moving belt when the line is unwound from the spool. In other words, the game 10 is provided with turning means for rotating the spool 72 whereby to shift the toy vehicle connected thereto by the tether longitudinally on the rotating roadway belt.

Figure 4:
FIG. 4 is a vertical section taken on the line 4—4 of FIG. 3 and showing means for locking a control shaft of the game.

A locking pad 84, see FIGS. 3 and 4, is provided in the slot 76 to support the arm 73 in the neutral position. This locking member 84 releasably holds the arm in a horizontal position at which time the friction wheel 80 is supported clear of the shafts 64 and 65 whereupon the truck is held stationary on the moving roadway belt by the control mechanism 22 and the tether 70 forming part of that mechanism.

The spool 72 is adapted to be selectively positioned on the arm 73 by means of a slide 90 which is mounted on the top wall 62 of the base extension. Wall 62 is provided with a transverse slot 92 and the slide 90 has legs 93 (FIG. 3) which project downwardly through this slot into operating engagement with the spool 72. This arrangement allows the slide 90 to be used to move the truck 18 across the roadway belt 14 as though changing lanes.

The automobile 20 is controlled in the same manner by its mechanism 22 which is constructed as previously described. In FIGS. 1 and 2, corresponding parts of the control mechanism for the car are designated by the same reference numerals and the suffix a. FIGS. 2 and 3 show still another belt and pulley drive connection 95 which interconnects the shafts 64 of the two control mechanisms so that all four shafts are driven simultaneously by the motor 54 and associated drive means 16.

The rear scenery panels 24 and 25 are mounted within a box-like lid 97 which is secured to the base 12 by a continuous hinge 98, see particularly FIG. 2. Two shafts 102 are journalled in suitable bearings (not shown) mounted within this lid, the shafts being located one near each of the rollers supporting the roadway belt 14. A lower roller 105 is mounted on each shaft 102 and this roller is surmounted by a relatively small diameter roller 106, see FIG. 1 only, which is also secured to the shaft to rotate therewith. The scenery panel 24 is on endless belt which is trained over the lower rollers 105 and the scenery panel 25 is a similar belt which is supported by the upper rollers 106. Both these background scenery panels are painted with suitable scenes, the belt 109 having scenes which might appear alongside a highway and the belt 110 having scenes remote from the highway.

The drive means 16 includes a belt and pulley drive connection 114, see FIG. 5, to the shaft 42 of the roadway belt so that the electric motor 54 is able to rotate the shafts 102 as well as the rollers secured thereto and thus move the panels 24 and 25 at constant speeds. Since the rollers 105 are wider than the rollers 106, the panel 24 travels faster than the panel 25. The panel 24 travels slightly slower than roadway belt 14 and someone viewing the game from the front receives the impression he is watching passing scenes both near and remote from the highway.

The two end panels 26 are painted with fixed scenes which blend in with the scenes appearing on the panels 24 and 25. In addition, the two end panels have road surfaces painted thereon to form a continuation of the road surface provided by the belt 14. A person viewing the game 10 from the front, or even from the ends, gains the impression he is seeing a stretch of country highway with the vehicles in motion. Both panels 26 are hinged to the base 12 as indicated at 116 in FIGS. 1 and 5. The lid 97 too is hinged so that the two end panels and the lid can be folded over the base 12 when the game is not in use and is stored away.

To operate the game, both arms 73 are placed in neutral and motor 54 is started. The roadway belt 14 moves at a suitable speed so that the vehicle seem to be rolling down the highway and this impression is increased by the movement of the background scenery panels 24 and 25 which are rotated in the same direction as the roadway belt.

A player operating the game may decide that one vehicle should overtake the other and this is done by appropriate movement of one of the arms 73. The car 20, for example, may be required to overtake the truck 18 whereupon the control mechanism 22 for the car is operated to advance the car ahead of the truck at a suitable passing speed. Later the child may decide that the car should overtake and pass the truck and this is done by co-ordinated use of the control mechanism associated with the automobile. The tether 70a connecting the car to its spool is wound in to move the car ahead of the truck and the slide 90a is then moved to cause the car to change lanes. The transversely moving car runs over the tether connected to the truck but this presents no problem and the car is able to run ahead of the truck in a normal manner.

Figure 6:
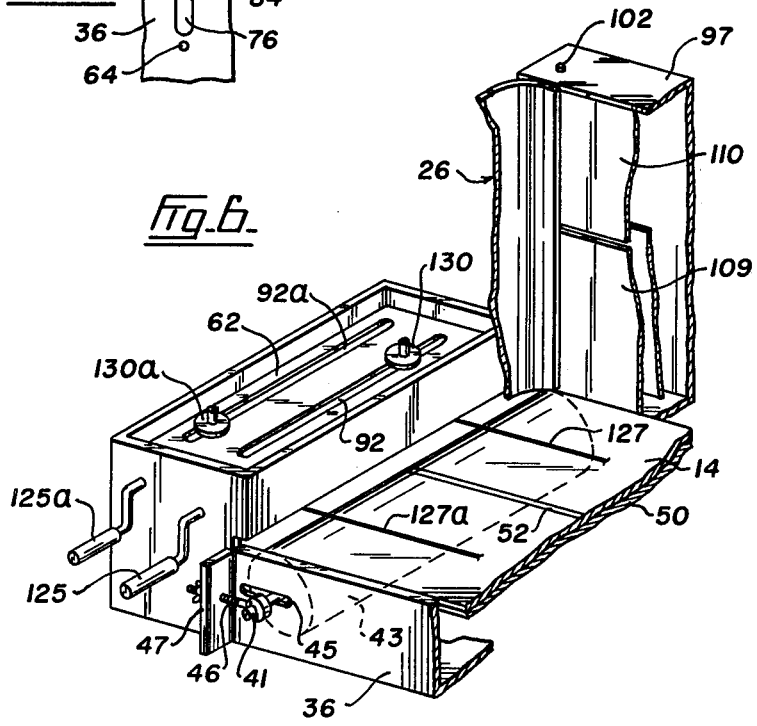
FIG. 6 is a perspective view of an portion of a simplified embodiment of the game.

FIGS. 6 and 7 shows a simplified embodiment of the invention which is constructed substantially as previously described accept that it is equipped with a hand-operated control mechanism 120 for each vehicle. These control mechanisms generally indicated at 120 each comprise a shaft 122 which is journalled in the front and rear walls 36 and 37 of the base. The transverse shaft 122 projects beyond the wall where it is fitted with a hand crank 125. A spool 126 (FIG. 7) is slidably and non-rotatably mounted on the transverse shaft, the spool being wound with a tether 127 which extends over the roadway belt 14 to the truck 18. Thus, a hand-operated turning means is provided which enables the truck to be shifted longitudinally on the moving roadway belt.

The modified game is provided with a slide 130 for moving the truck from one roadway lane to another. This slide is mounted on the top wall 62 of the base extension and legs 131 of the slide project downwardly through the top wall slot 92 to engage the spool 126 therebelow. The other control mechanism 120 for the car is constructed in the same manner and, of course, is positioned on the base extension alongside the other mechanism as shown in FIG. 6. The few parts of the second control mechanism which do appear in FIG. 6 are designated by the same reference numerals and the suffix a.

To operate the simplified embodiment of the game, power is fed to the motor 54 to drive the belt 14 and rotate the scenery panels 24 and 25 as previously described. The two vehicles remain in their preset positions on the moving highway until one player decides that the vehicle over which he has control should overtake and pass the other vehicle. This maneuver the player executes by turning his hand crank 125 so as to rotate the shaft 122 and the spool 126 whereby to wind in the tether attached to his vehicle whereupon that vehicle is moved forward to a position a suitable distance in front of the other vehicle. The player then shifts the appropriate slide 130 across the top wall 62 to place his vehicle in the lane he wishes the vehicle to occupy. The car and truck can be moved about in this manner by the two players who pretend they are driving the vehicles on the simulated highway.

I claim:

1. A highway game comprising a base, a roadway belt rotatably mounted on the base, a toy vehicle having wheels engaging the roadway belt, a control mechanism for the toy vehicle mounted at one end of the base, said control mechanism including a winding device wound with a tether secured to the vehicle, drive means for rotating the roadway belt in one direction to turn the wheels of the toy vehicle and simulate movement of said vehicle in the opposite direction, turning means for rotating the winding device for shifting the toy vehicle longitudinally on the rotating roadway belt, said turning means including a manually operable transverse shaft rotatably supported by the base, said winding device being slidably and non-rotatably mounted on the transverse shaft, a manually operable slide mounted on the base in operative engagement with the winding device whereby the toy vehicle can be shifted laterally on the rotating roadway belt, first and second endless scenery panels rotatably mounted on the base alongside the roadway belt, said drive means including a drive connection for rotating the endless scenery panels in the same direction as the roadway belt, said first endless scenery panel depicting scenes normally found adjacent a highway and said second endless scenery panel depicting scenes normally found relatively far from the highway, said first and second endless scenery panels being separately mounted on rollers, the rollers supporting the first endless scenery panel being of greater diameter than the rollers supporting the second endless scenery panel whereby the former panel moves faster than the latter panel.

2. A highway game comprising a base, an endless roadway belt rotatably mounted on the base and having markings representing lanes, first and second toy vehicles having rotatable wheels engaging the roadway belt with said vehicles normally occupying separate lanes, a control mechanism for each toy vehicle, said control mechanisms being mounted on the base at a forward end thereof and each including a tether extending over the endless roadway belt and attached to one of the toy vehicles, drive means for rotating the endless roadway belt to rotate the wheels of the toy vehicles and simulate forward motion of said vehicles, said control mechanisms each including a pair of driven shafts rotatably mounted on the base near one end of the roadway belt, said drive means including a drive connection to each pair of driven shafts for rotating said shafts in opposite directions, a control shaft mounted on the base adjacent each pair of driven shafts for movement towards and away from said driven shafts, a winding spool slidably and rotatably mounted on each of the control shafts, a friction wheel on each winding spool adapted to be moved into engagement with either of the oppositely rotating pair of driven shafts by manual movement of the control shaft supporting said winding spool and a manually operable slide mounted on the base in operative engagement with each winding spool whereby the toy vehicles are separately shiftable laterally on the rotating roadway belt.

3. A highway game as claimed in claim 2, in which said control shaft has one end pivotally mounted on the base and a movable part slidably extending through a slot formed in a part of said base, and a locking member carried by the base part for releasably securing the control shaft in a selected position within the slot wherein the friction wheel is held disengaged from the pair of driven shafts.

4. A highway game comprising a base, an endless roadway belt rotatably mounted on the base and having markings representing lanes, first and second toy vehicles having rotatable wheels engaging the roadway belt with said vehicles normally occupying separate lanes, a control mechanism for each toy vehicle, said control mechanisms being mounted on the base at a forward end thereof and each including a tether extending over the endless roadway belt and attached to one of the toy vehicles, drive means for rotating the endless roadway belt to rotate the wheels of the toy vehicles and simulate forward motion of said vehicles, said control mechanisms each including a transverse shaft rotatably supported by the base and being fitted with a hand crank, a winding spool slidably and non-rotatably mounted on each transverse shaft and around which an end of one of the tethers is wound, and a manually operable slide mounted on the base in operative engagement with each winding spool whereby the associated toy vehicle can be shifted from lane to lane as well as be moved longitudinally of the rotating endless roadway belt in response to operation of the associated hand crank.

5. A highway game as claimed in claim 4, and including a first and second endless scenery panels rotatably mounted on the base alongside the roadway belt, said drive means including a drive connection for rotating the first and second endless scenery panels in the same direction as the roadway belt, said first endless scenery panel being separately mounted on large diameter rollers depicting scenes normally found adjacent a highway said second endless scenery panel being separately mounted on relatively small diameter and depicting scenes normally found relatively far from the highway.

6. A highway game comprising a base, an endless roadway belt rotatably mounted on the base and having markings thereon representing lanes, at least two vehicles each having wheels engaging the roadway belt with said vehicles normally occupying separate lanes, a control mechanism for controlling each of the toy vehicles, said control mechanisms each including a tether extending over the endless roadway belt along one of the lanes and being attached to the toy vehicle in that one lane, drive means for rotating the endless roadway belt to rotate the wheels of the toy vehicles and simulate forward motion of said vehicles, said control mechanisms each including a pair of driven shafts rotatably mounted on the base in spaced and parallel relation near one end of the roadway belt, said drive means including drive connections to each pair of driven shafts for rotating said shafts in opposite directions, a control shaft mounted on the base between each pair of driven shafts for movement towards and away from said shafts, a winding spool slidably and non-rotatably mounted on each control shaft and around which an end of one of the tethers is wound, a friction wheel on each winding device adapted to be moved into engagement with either of the adjacent pair of driven shafts by manual movement of the control shaft, said control shafts each having a movable part slidably extending through a slot formed in a part of said base, a locking member carried by the base part for releasably securing each control shaft in a selected position within the slot with the friction wheel held disengaged from the adjacent pair of driven shafts, and a manually operable slide mounted on the base in operative engagement with each winding spool whereby the toy vehicles are shiftable from lane to lane as well as being movable longitudinally of the rotating endless roadway belt in response to operation of the control shafts.

7. A highway game as claimed in claim 6, and including a first and second endless scenery panels rotatably mounted on the base alongside the roadway belt, said drive means including a drive connection for rotating the first and second endless scenery panels in the same direction as the roadway belt, said first endless scenery panel being separately mounted on large diameter rollers found adjacent a highway, said second endless scenery panel being separately mounted on relatively small diameter and depicting scenes normally found relatively far from the highway.

* * * * *